W. L. CHERRY.
BELT STRETCHER.
APPLICATION FILED AUG. 14, 1918.
1,344,485.
Patented June 22, 1920.
2 SHEETS—SHEET 1.
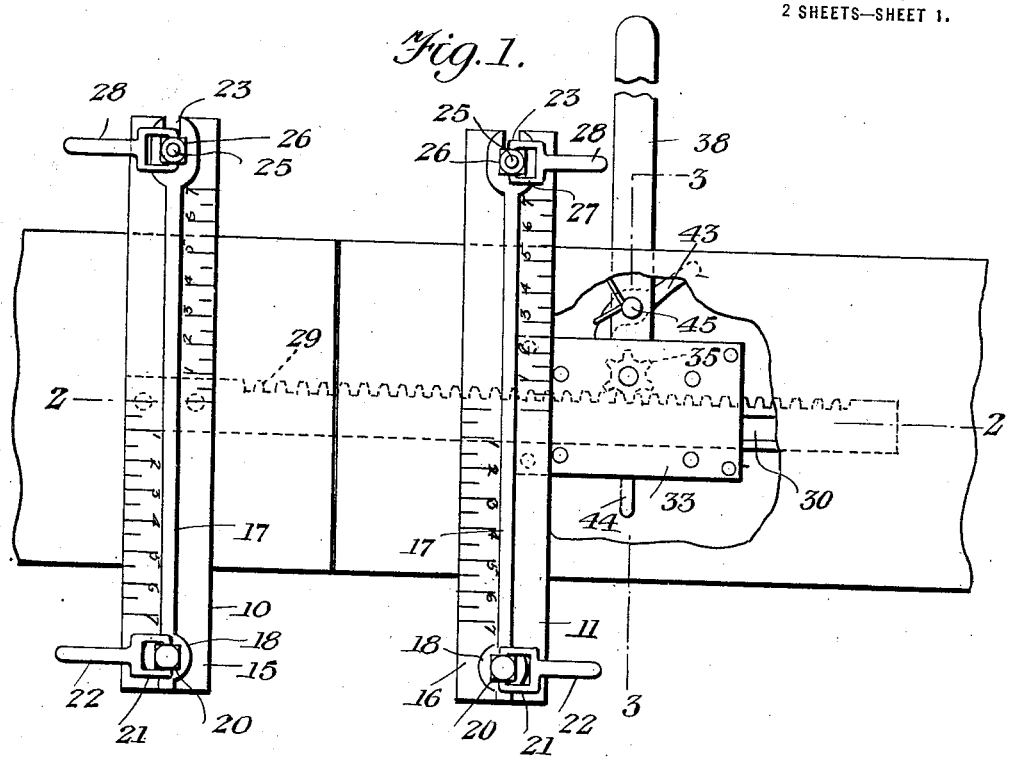
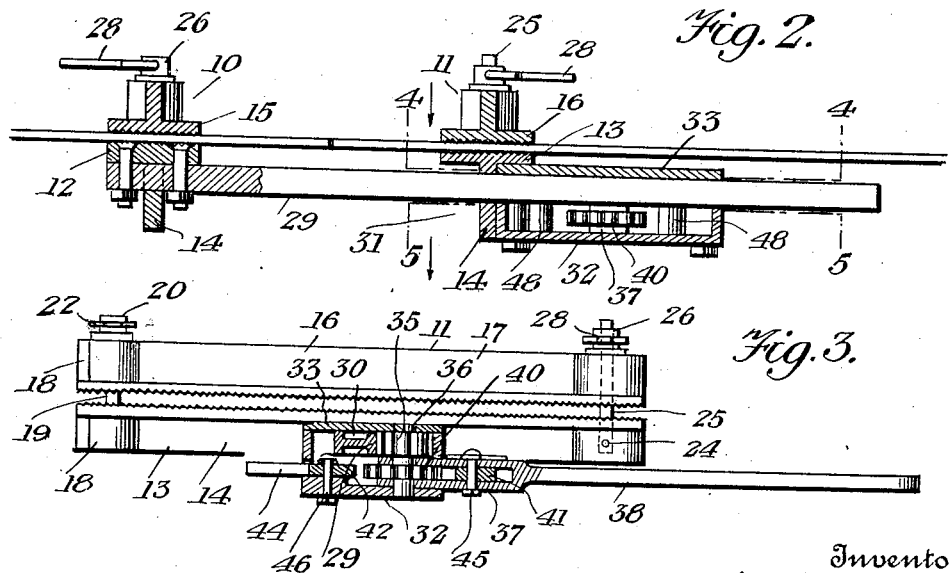
Inventor
W. L. Cherry
By Victor J. Evans
Attorney

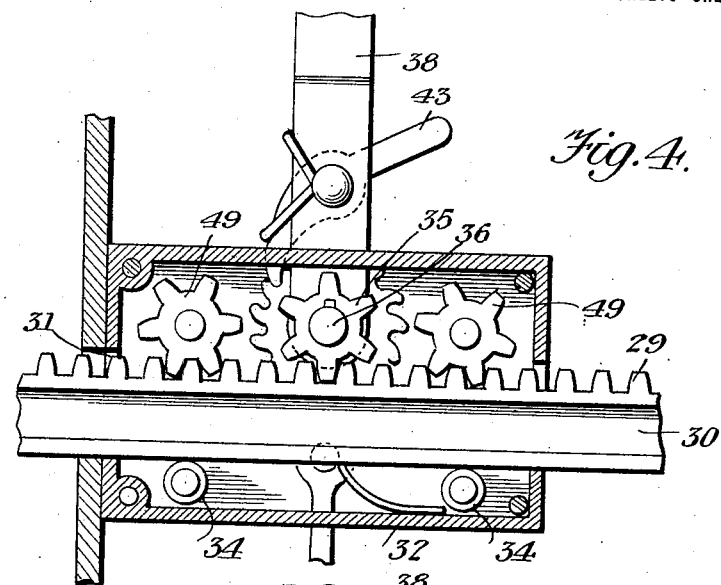
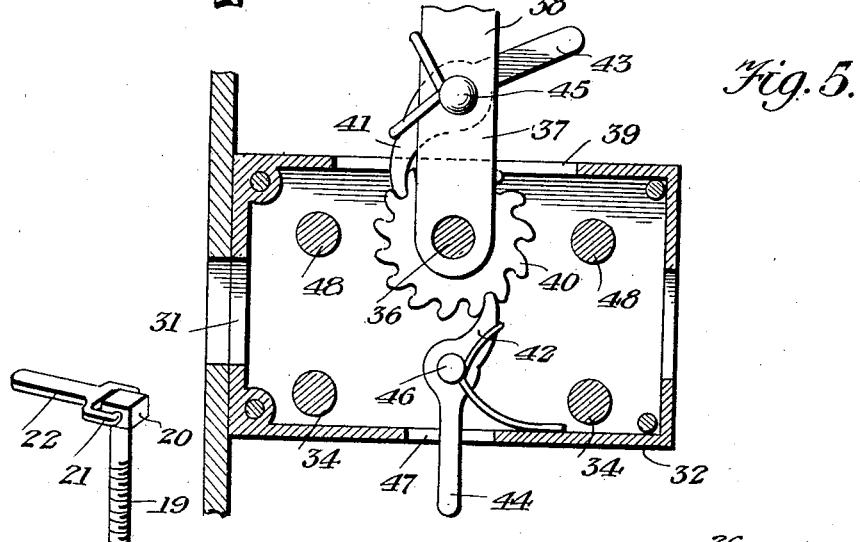
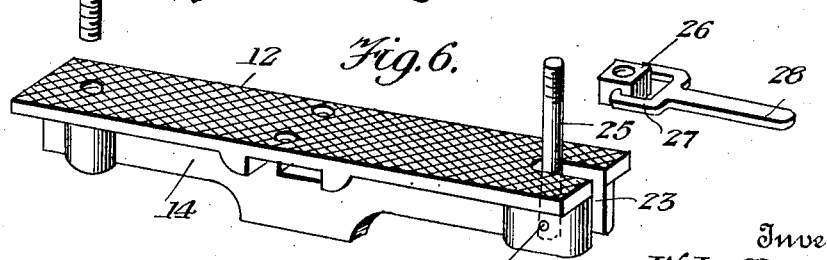

UNITED STATES PATENT OFFICE.

WARREN L. CHERRY, OF WOLFE CITY, TEXAS.

BELT-STRETCHER.

1,344,485.  Specification of Letters Patent.  Patented June 22, 1920.

Application filed August 14, 1918. Serial No. 249,870.

*To all whom it may concern:*

Be it known that I, WARREN L. CHERRY, a citizen of the United States, residing at Wolfe City, in the county of Hunt and State of Texas, have invented new and useful Improvements in Belt-Stretchers, of which the following is a specification.

This invention relates to an improvement in belt stretchers and has for its object to produce a simple, cheap, reliable and easily operated means for gripping the ends of a belt and drawing such ends toward each other so that the said belt ends may be readily laced or adjusted.

The foregoing objects, and others which will appear as the nature of the invention is better understood, may be accomplished by a construction, combination and operative arrangement of parts, such as illustrated by the accompanying drawings.

In the drawings:

Figure 1 is a top plan view of the invention showing a belt to be stretched or laced gripped thereby, part of said belt being broken away;

Fig. 2 is an enlarged sectional view approximately on the line 2—2 of Fig. 1;

Fig. 3 is a similar view approximately on the line 3—3 of Fig. 1;

Fig. 4 is a horizontal sectional view approximately on the line 4—4 of Fig. 2; and Fig. 5 is a horizontal sectional view approximately on the line 5—5 of Fig. 2.

Fig. 6 is a view of one of the lower clamping plates.

As disclosed by the drawings, two sets of clamps are employed. Each of these clamps is of a substantially similar construction, but for distinction the stationary clamp is indicated by the numeral 10 and the movable clamp by the numeral 11. Each of the clamps includes a pair of superimposed members preferably in the nature of T-plates, and the confronting surfaces of said members may and preferably are roughened. The lower members of the respective clamps are indicated by the numerals 12 and 13 respectively, the central rib or flange 14 thereof depending from the said members 12 and 13. The upper members of the respective clamps are indicated by the numerals 15 and 16 respectively, the central flange 17 therefor being arranged longitudinal throughout the center thereof. The flanges 14 and 17 of the members constituting the upper and lower clamps, adjacent the ends thereof are enlarged, being formed with vertically disposed bosses 18. Secured to one end of the lower members 12 and 13, and projecting from the upper faces thereof and extending through suitable openings in the bosses 18 of the upper members of the respective clamps are bolts 19. These bolts have heads 20, the said heads having swiveled thereto the bifurcated ends 21 of levers 22. By this arrangement it will be noted that the nuts may be quickly screwed upon the bolts to permit of the members constituting the clamps being brought away from or held against each other, thus to grip or release the belt engaged therebetween.

The bosses on the opposite ends of the clamp members constituting the clamps are slotted from the outer ends of the said members, the said bosses having their outer portions disposed in a line with the ends of the clamps. These slots are indicated by the numerals 23, and in the slots of the lower members 12 and 13 there is pivotally secured as at 24 a bolt 25. Each of the bolts 25 has arranged thereon a nut 26 and each of the nuts is engaged by the bifurcated end 27 of a lever 28. The bolts 25 may be swung over the bosses 18 of the upper members 15 and 16, through the referred to slots 23, and the levers may be turned to cause the nuts to contact with the outer faces of the bosses, and thus bind the jaws constituting the clamps against each other to hold the belt therebetween.

The upper jaw members 12 and 13 of the clamps are scaled, being divided into inch marks and fractions thereof, one of the scales being arranged to one side of the flange 14 and the other being arranged to the opposite side of the said flange, so that in reality each of the members 12 and 13 is provided with two scales that terminate or begin at the center of the said members. The flange on the under face of the jaw or member 12 of the stationary clamp is formed with a centrally arranged rack 29. This bar is arranged at a right angle with respect to the member 12 and projects therefrom in one direction only. The teeth of the rack are formed on only one of the edges thereof and preferably the opposite faces or sides of the bar are provided with longitudinal grooves 30 to reduce the frictional engagement thereof with certain elements which will hereinafter be set forth. The rack bar passes through a central slot 31 in the flange 14 of the member 13 of the clamp 11 and also passes through alining slots in a substantially rectangular housing 32 formed with or secured upon the member or jaw 13. The housing 32 is provided with a removable cover 33 and has journaled therein guide rollers 34 which contact with the straight or non-toothed edge of the rack bar. The toothed portion of the rack bar is engaged by a toothed wheel 35. The shaft has its opposite ends journaled in the housing and cover therefor. The shaft 36 passes through the bifurcated end 37 of an operating lever or handle 38 which plays through a suitable elongated opening 39 in one of the sides of the housing. On the shaft 36, between the members or arms provided by the bifurcated end of the operating lever 38 is keyed or otherwise secured a toothed wheel 40 which is somewhat in the nature of a ratchet wheel, having its teeth arranged at a slight inclination, the outer ends of the said teeth being rounded and the wall between the teeth being likewise rounded. The teeth of the wheel 40 are engaged by oppositely disposed spring influenced dogs 41 and 42, each provided with an operating handle 43 and 44 respectively. The dog 41 is pivoted in the bifurcated end of the operating lever 38, as indicated by the numeral 45, the dog 42 being pivoted on the housing 32 as at 46 and the handle or tail thereof passes through a somewhat elongated slot 47 in the side of the housing opposite that provided with the opening 39.

In the housing, preferably directly opposite the guide rollers 34 is journaled suitable shafts 48. On each of these shafts is formed, keyed or otherwise secured a toothed wheel 49, the same meshing with the teeth of the rack bar provide guides for the bar.

When both of the dogs are brought to engage with the toothed wheel 40 the device is held against movement. When the operating lever 38 is swung to one position the dog 41 carried thereby will ratchet over the toothed wheel 40, the dog 42 serving as a holding dog. When the lever is swung in another direction the dog 41 will engage with the teeth of the wheel 40 to revolve the same, the dog 42 ratcheting over the said wheel. The turning of the toothed wheel 40 will, of course, turn the wheel 35, the latter engaging with the teeth of the rack bar will actuate the same. The dogs 41 and 42 are released to permit of the free movement of the jaw 11 in an outward direction with respect to the jaw 10, the operation of the lever 38 being such as to move the jaw 11 toward the jaw 10.

Having thus described the invention, what is claimed as new, is:—

A belt stretcher including clamps, each comprising a pair of superimposed plates having their confronting faces roughened and their outer faces centrally formed with longitudinal ribs having bosses on the ends thereof, each pair of plates at one of the ends thereof having slots which enter the bosses thereof, bolts pivoted in the slotted bosses of the lower plates, nuts having levers swiveled thereon engaging the bolts, said plates having openings passing through the bosses thereof at their opposite ends, and the openings in the lower plates being threaded, bolts having swiveled levers on the heads thereof received in the openings and engaging the threads of the openings in the lower plates, a rack bar secured to the rib of one of the lower clamping plates and passing through an opening in the rib of the second lower clamping plate, a housing secured on the rib of the last mentioned plate and receiving therethrough the said rack bar, means in said housing co-engaging with the rack bar for moving the same longitudinally to adjust the clamps with respect to each other, and operating means for said actuating means disposed exteriorly of the housing.

In testimony whereof I affix my signature.

WARREN L. CHERRY.